3,574,600
PROCESS FOR RECOVERY OF GOLD FROM CARBONACEOUS ORES

Bernard J. Scheiner, Sparks, and Roald E. Lindstrom and Thomas A. Henrie, Reno, Nev., assignors to the United States of America as represented by the Secretary of the Interior
No Drawing. Filed May 15, 1968, Ser. No. 729,382
Int. Cl. C22b 11/08
U.S. Cl. 75—105                                3 Claims

ABSTRACT OF THE DISCLOSURE

Carbonaceous gold ores are rendered amenable to a conventional cyanide recovery process by pretreatment with acid-ozone mixture, or alkaline sodium hypochlorite or alkaline calcium hypochlorite compounds at temperatures under 70° C. Hypochlorite solutions can be generated in situ by electrolysis of chloride solutions.

---

This invention resulted from work done by the Bureau of Mines of the Department of the Interior, and the domestic title to the invention is in the Government.

BACKGROUND OF THE INVENTION

Field of invention

This invention relates to the recovery of gold from carbonaceous gold ores. More particularly, the invention concerns an improved cyanide leach of these ores wherein the ore is treated prior to the cyanide leach. Used herein, the term "carbonaceous ore" refers to a refractory ore, that is, one not amenable to a conventional cyanide treatment, and one which contains carbonaceous impurities capable of absorbing a gold-cyanide complex. These ores generally contain from about 0.25–0.8% by weight of organic carbon having properties similar to humic acid. The total carbon content of the ores averages from 2–5% weight percent with selected portions of the ore containing as much as 12% carbon. Ores of this type are found intermingled with oxide gold ores throughout the world. They are particularly prevalent wherever the gold deposit is the result of hydrothermal deposition of carbonaceous strata. Large bodies of carbonaceous ores are found in South Africa and in the states of Nevada, Utah, Montana, California and Idaho of the United States. Conventional cyanide processes can recover only 25–35 percent of the gold present in carbonaceous ores. At present, there are large amounts of both located carbonaceous deposits and stocks of mined carbonaceous ore which have been set aside because it has heretofore been uneconomic to treat them by the conventional cyanide process.

DESCRIPTION OF THE PRIOR ART

Previous methods for rendering carbonaceous gold ores amenable to cyanide treatment have involved treating the ore with mineral oils as disclosed in U.S. Pats. 1,411,326 and 1,461,807 or with wetting agents as described in U.S. Pat. 2,234,140. Whereas this type of treatment lessens premature physical absorption of gold cyanide complex on the inorganic carbon present in some gold ores such as graphite from graphitic schists and other forms of inorganic carbon, we have found that it does not prevent the even more deleterious chemical absorption attributed to the organic carbon present in carbonaceous ores. No prior process has been designed to prevent such absorption of the gold cyanide complex. Consequently there remains a need in the art for a process which will enable economic recovery of gold from the large known sources of carbonaceous ores.

SUMMARY OF INVENTION

Briefly, the present invention presents a method whereby the ability of the carbonaceous impurities contained in carbonaceous ores to absorb the gold-cyanide complex formed in the cyanide process is destroyed prior to cyanidation. This is accomplished by treating an aqueous slurry of the ore at a temperature of less than 70° C., with either a mixture of acid-ozone, an alkaline hypochlorite salt or an alkaline hypochlorite formed in situ by chemical reaction or by electrolysis of chloride solutions.

DESCRIPTION OF THE PREFERRED EMBODIMENTS

The starting materials upon which the present invention operates have been termed "carbonaceous ores," a specific type of gold ore which is capable of absorbing $Au(CN)_2^-$. Heretofore it has not been recognized that gold ores were capable of absorbing the gold-cyanide complex by chemical as well as physical absorption. Our studies have established that carbonaceous gold ores containing organic carbon do in fact absorb the complex by both mechanisms. Examples I and II below are clear illustrations of the phenomena. As shown in Example III below, contacting the ore with large amounts of kerosine, a treatment which has previously been shown by others to be effective in preventing physical absorption, does not eliminate the problem of complex absorption. It is our discovery that pretreatment of carbonaceous ores at a temperature less than 70° C. with either an acid-ozone system or with an alkaline hypochlorite will prevent absorption of the complex by carbonaceous impurities and will for the first time allow an economical recovery of gold from carbonaceous ores.

Refractory gold ores have previously been treated with acid systems such as for example the acid oxidation described by Hedley et al. in U.S. Pat. 2,777,764. There, refractory precious metal ores are contacted with large amounts of acidic oxidizing agents, preferably an $H_2SO_4-$ air system, under high pressures and at temperatures in the range of from 120–130° C. The purpose of the treatment is to oxidize the ore so that the various impurities do not consume the oxygen necessary for the formation of the $Au(CN)_2^-$ complex during cyanidation. As the impurities react with the oxidant they in turn form additional acid. In contradistinction, our process is not designed to enhance the formation of the complex but rather to prevent the absorption of the complex by the carbonaceous impurities after it has been formed. Accordingly, the acid-ozone treatment of the present invention does not operate under the severe conditions required by Hedley et al. Temperatures must not exceed 70° C. and a temperature of ambient room temperature is preferred.

High pressures are not required and normal atmospheric pressures are preferred for economic reasons. The treatment is carried out by first forming an aqueous slurry of ground ore. Slurries of high density of about 1:1 liquid to solids are preferred but not necessary. A mineral acid is added until a pH of about 1 is obtained. For this purpose, sulfuric, nitric and hydrochloric acids are preferred. At that point ozone is bubbled through the acidified slurry. The amount of ozone necessary will depend upon the nature of the carbonaceous ore used. The optimum amount for each ore is easily determined by finding the point at which further ozone addition does not improve gold extraction. Unlike the Hedley et al. process, the pH of the slurry during ozone addition will gradually increase until at the end of the treatment of the pH of about 2 to 4 is obtained. Since the efficiency of the ozonation is greater at lower pH's, more acid may be added to keep the pH in an optimum range of from 1.0 to 1.5.

After the acid-ozone treatment, the carbonaceous ore is filtered from the slurry and treated by conventional cyanidation techniques. It will be found in all cases that gold recovery is substantially improved by the pretreatment. Recoveries in the range of from 90–96% can be expected.

A pretreatment with hypochlorite is an alternative to the above described acid-ozone treatment. Hypochlorites have previously been used as a pretreatment for oxidizing impurities in gold ores which would consume the oxygen necessary during cyanidation. U.S. Pat. 781,590 to Merrill is an example of such a process. There, refractory ores containing materials which prevent cyanidation by removing oxygen from solution are oxidized with a hypochlorite prior to cyanidation. The present invention, which also contemplates a hypochlorite pretreatment is not concerned with ores of the type described by Merrill, but is limited to "carbonaceous ores" which do not prevent cyanidation by consuming oxygen but rather by absorbing the gold-cyanide complex after it has been formed. Example V below shows that even if massive quantities of air are provided during cyanidation, very little gold is recovered.

Treatment of carbonaceous ore with hypochlorite is accomplished by adding sodium or calcium hypochlorite in solid or solution form to an aqueous slurry of ground ore. Again high density slurries of about 1:1 liquid to solids are preferred. The amount of hypochlorite used will vary with the ore undergoing treatment as will the length of contact. The temperature of the slurry should be less than 70° C. and should be maintained in the range of from ambient to 60° C., with temperatures of from 50° C. to 60° C. being preferred. Lime may be added to the aqueous slurry along with the hypochlorite to enhance the treatment but is not necessary.

As a further embodiment to the invention, hypochlorite may be formed in situ chemically or electrolytically. In situ formation by chemical reaction is accomplished by adding both sodium hydroxide and chlorine to the ore slurry. Electrolytic formation of hypochlorite is accomplished by electrolysis of a sodium chloride solution. The latter method can be used to form hypochlorite which is added to the ore slurry and the entire slurry electrolyzed. Electrolysis of sodium chloride is a particularly attractive method of producing the treatment agent at remote sites. Also, if electrolysis is used, less external heat is needed during the treatment.

After any of the pretreatments discussed above, the ore may be passed to a conventional cyanidation with markedly improved recoveries. In this respect, the following examples are provided to set forth and illustrate the invention.

EXAMPLE I

An ore containing 0.23 oz./ton gold, and 0.97% total carbon including 0.35% organic carbon was contacted with a synthetic solution of $Au(CN)_2^-$ having a concentration of 11.1 g./l. for 2 hours. Upon assay it determined that the ore had absorbed 12.5 oz. of gold per ton of ore.

EXAMPLE II

An ore containing .06 oz./ton gold and 10.1% total carbon including 4% organic carbon was contacted for 2 hours with the synthetic $Au(CN)_2^-$ solution used in Example I. Upon assay it was determined that this ore absorbed gold at the rate of 139.9 oz./ton of ore.

EXAMPLE III

The ore used in Example II was contacted with 8 gal./ton of kerosine prior to contact with the $Au(CN)_2^-$ complex as in Example II. Upon assay it was determined that the kerosine treated ore absorbed gold at the rate of 111.9 oz./ton of ore.

Examples I and II illustrate the pheonmena of $Au(CN)_2^-$ absorption by carbonaceous gold ores. Example III illustrates the nature of the absorption. There, a kerosine treated ore absorbed 85% as much gold as the same ore without kerosine treatment. This shows that the prior methods of dealing with carbonaceous gold ores which were directed at physical absorption were only attacking a small portion of the total problem.

EXAMPLE IV

One hundred grams of an ore containing 0.23 oz./ton of gold and 0.35% by weight organic carbon was slurried with 300 mls. of water, .25 gram lime and 0.10 gram sodium cyanide, stirred for 24 hours and filtered. The tailings were assayed and gold extraction was calculated at 25–30%.

This example illustrates the poor recovery of gold from carbonaceous ores resulting from conventional cyanidation.

EXAMPLE V

The procedure of Example IV was repeated and massive quantities of air were bubbled through the slurry during cyanidation. Upon assaying the tailings it was found that the addition of excess air had no effect upon gold recovery.

This example shows that the problem with carbonaceous ores is not that they act as reducing agents and absorb oxygen necessary for cyanidation, for even with excess oxygen present carbonaceous ores do not respond favorably to a cyanide leach.

EXAMPLE VI

One hundred grams of the ore used in Example IV was slurried with 300 mls. of water. The pH was adjusted to 1 with sulfuric acid. The slurry was continuously stirred and ozone was added at a rate such that no ozone escaped the top of the solution which was 2 grams per hour. Ozonation continued for 4 hours at which time the pH of the slurry had risen to 2. The entire treatment was carried out at room temperature. The resulting slurry was filtered, repulped and treated to a conventional cyanidation as in Example IV. Upon assaying the tailings, gold recovery was found to be 96%.

EXAMPLE VII

The procedure of Example VI was repeated substituting nitric acid for sulfuric acid. Again, gold recovery was 96%.

EXAMPLE VIII

The procedure of Example VI was repeated substituting hydrochloric acid for sulfuric acid. Again, gold recovery was very high.

Examples VI, and VII and VIII illustrate the substantial increase in gold recovery from carbonaceous ores obtained by a acid-ozone treatment according to the present invention.

EXAMPLE IX

One hundred grams of an ore containing 4.8% total carbon of which 0.42% is organic and 0.36 oz./ton of gold was treated to a conventional cyanidation as in Example IV gold recovery was 25%.

One hundred grams of the same ore was slurried with 150 mls. of water. To this there was added 1 gm. of lime and 1 gm. NaOCl. The slurry was then heated at 60° C. for 1 hour. During the following hour, while still at 60° C., an additional 0.5 gm. of NaOCl was added to the slurry. Heating was continued for an additional 6 hours at 60° C. Then 0.10 gm. of sodium cyanide was added and the mixture stirred for 24 hours. Gold extraction was calculated at 96%.

EXAMPLE X

Three hundred grams of the type ore used in Example I was slurried with 2 liters of 0.4 percent sodium hydroxide solution. Chlorine gas was then bubbled through the slurry at the rate of 4.8 g./hour for 1.33 hours. The final pH was 7.3. The slurry was then filtered, repulped and treated by conventional cyanidation. Gold recovery was 92%.

EXAMPLE XI

One hundred grams of the type ore used in Example VIII was slurried with 300 ml. of water. Then, 30 grams of NaCl were added. The slurry was then placed in an electrolytic cell having a graphite anode and a copper cathode. A 2 amp current at 5 volts was passed through the cell for 30 minutes. The slurry was constantly stirred during this time period. The electrodes were removed and the temperature was increased from room temperature to 60° C. for 2 hours with continual stirring. The slurry was then filtered and repulped with 300 mils of water before conventional cyanidation. Gold recovery was 85%. It was expected that with more sophisticated equipment, the percent gold recovered using in situ electrolysis will be equal to that obtained in the other embodiments of the invention.

Examples IX, X, and XI illustrate the improved recovery of gold from carbonaceous ores made possible by a treatment with hypochlorite before cyanidation. Further, the latter two examples illustrate the various means of in situ hypochlorite production.

Though the invention has now been described with reference to preferred embodiments and specific examples, it will readily be appreciated by those of ordinary skill in the art that many modifications and adaptions of the invention are possible without departure from the spirit and scope of the invention as claimed hereinbelow.

What is claimed is:

1. A method of treating carbonaceous gold ore to prevent absorption of $Au(CN)_2^-$ during a subsequent cyanide leach comprising contacting an aqueous slurry of said ore with a mineral acid to lower the pH of said slurry to a range of from about 1.0 to 2.0, and further contacting said slurry with ozone at a temperature of less than 70° C.

2. The method of claim 1 wherein said mineral acid is selected from the group consisting of sulfuric acid, nitric acid and hydrochloric acid.

3. The method of claim 2 wherein the pH of said slurry is maintained in the range of from 1.0 to 1.5 during the ozone addition.

References Cited

UNITED STATES PATENTS

| | | | |
|---|---|---|---|
| 738,758 | 9/1903 | Baxeres de Alzugaray | 75—101 |
| 3,150,960 | 9/1964 | Hunter | 75—101X |
| 3,238,038 | 3/1966 | Hunter | 75—101X |

L. DEWAYNE RUTLEDGE, Primary Examiner

J. E. LEGRU, Assistant Examiner

U.S. Cl. X.R.

75—101, 108, 117